J. D. RENSINK.
Potato-Diggers.
No. 138,934. Patented May 13, 1873.
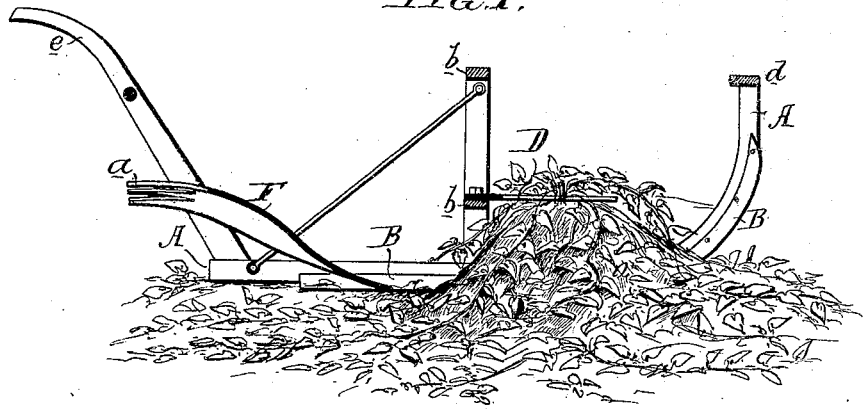
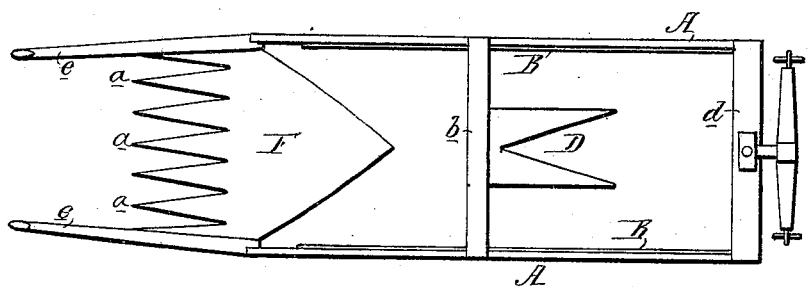
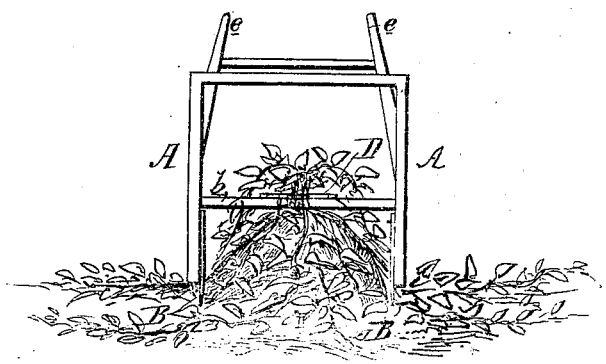
Witnesses,
Harry Smith
Thomas McIlvain
John D. Rensink
By his Attys.
Howson & Son

UNITED STATES PATENT OFFICE.

JOHN D. RENSINK, OF BRIDGEPORT, NEW JERSEY.

IMPROVEMENT IN POTATO-DIGGERS.

Specification forming part of Letters Patent No. 138,934, dated May 13, 1873; application filed February 3, 1873.

*To all whom it may concern:*

Be it known that I, JOHN D. RENSINK, of Bridgeport, Gloucester county, State of New Jersey, have invented an Improved Potato-Digger, of which the following is a specification:

My invention relates to improvements in potato-diggers, which, when drawn forward over the hills or rows, will sever the vines, dig up the potatoes, and separate the dirt from the same.

I construct the apparatus in the form of a sled, (as best observed in the sectional view, Figure 1, and transverse section, Fig. 2, of the drawing,) having runners A A, armed with knives B, a forked cutter, D, between the said runners, and an inclined V-shaped plow, F, provided at its rear end with bars or fingers a, having spaces between them and forming a riddle, as hereafter described. The runners A are connected together by cross-bars b, braced at suitable points, and at the front of the apparatus is a bar, d, to which the swingle-tree for the draft-animals is connected, and at the rear of the apparatus are two guiding-handles, e, similar to those of a plow.

My improved digger may be used for excavating ordinary white or round potatoes; but it is intended especially for sweet-potatoes, which are planted in hills, and which cannot be readily turned up with an ordinary plow, owing to the nature of the vines, which extend over the ground in all directions from the centers of the hills, become entangled when merely pushed before the plow, as they are too tough to break, and necessitate very frequent stoppages; hence it has been usual to dig sweet-potatoes almost exclusively by hand by means of a grubbing-hoe.

The operation of my improved digger is as follows: It is drawn forward over the hills, as shown in the drawing, so that the runners A shall be on opposite sides of the same, the knives B slightly penetrating the soil and severing the outlying vines, while the forked knife D, which is directly over the center of the hill, cuts off the stalks of the vines close to the said hill, all chance of entanglement by the vines being thus prevented. The plow F next penetrates the base of the hill, overturns the same, and excavates the potatoes, the latter, with a portion of the dirt, passing up over the plow and onto the bars or fingers a, in passing over which the dirt is entirely riddled or separated from the potatoes and falls through the spaces between the bars, the potatoes falling from the rear ends of the latter onto the ground, from which they are picked up as usual.

I prefer to use longitudinal bars or V-shaped fingers a as a riddle for the potatoes; but a coarse sieve or grating would answer the purpose.

Both the forked blade D and plow may be made adjustable in height, and may be arranged to be inclined to any angle to suit the work to be performed; and for digging white potatoes it will generally be preferable to detach the forked cutter D.

I claim as my invention—

1. The combination of the cutting-blades B B and forked cutter D, arranged above and behind the blade, as set forth.

2. The combination of the runners B B, sharpened at the edges, forked cutter D, plow F, and riddle a, as set forth.

In testimony whereof I have signed my name to this specification in the presence of two subscribing witnesses.

JOHN D. RENSINK.

Witnesses:
 WM. A. STEEL,
 HUBERT HOWSON.